J. POWERS.
PRESSURE-GAGE.
No. 171,317.
Patented Dec. 21, 1875.
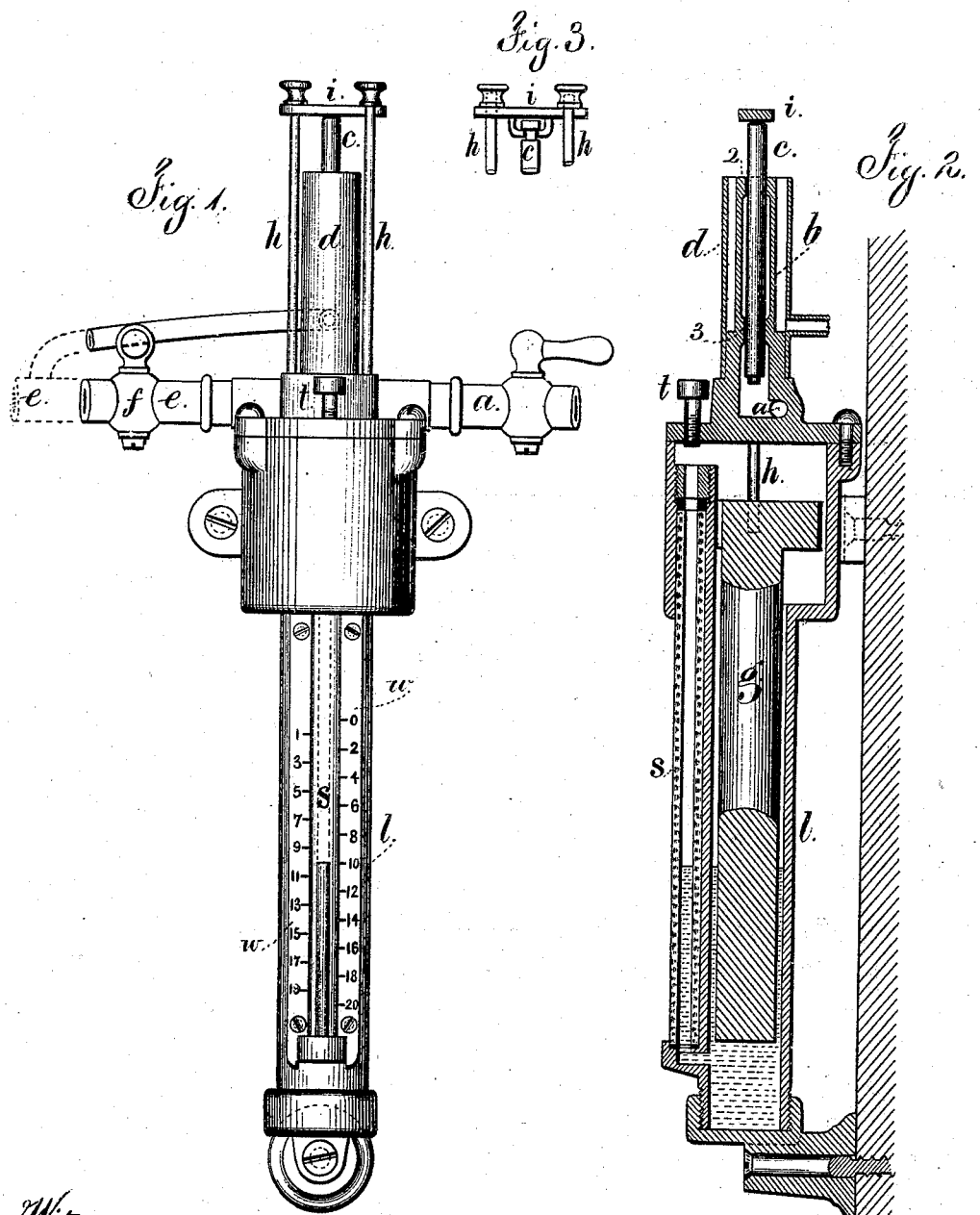

UNITED STATES PATENT OFFICE.

JOHN POWERS, OF NEW YORK, N. Y.

IMPROVEMENT IN PRESSURE-GAGES.

Specification forming part of Letters Patent No. 171,317, dated December 21, 1875; application filed March 20, 1875.

*To all whom it may concern:*

Be it known that I, JOHN POWERS, of the city and State of New York, have invented an Improvement in Pressure-Gages, of which the following is a specification:

Pressure-gages have been made of a column of mercury, and also of a float pressed into mercury. My improvement is the reverse of these, and consists of a dead weight, that resists the maximum pressure when out of the mercury, and which becomes less and less as it is immersed in mercury, until, finally, the weight is balanced, and indicates no pressure.

By this construction the gage is direct-acting, and free from the risk of variations that always exist in gages where a float is relied upon for the pressure. My gage is not interfered with by friction, as it is substantially frictionless, and it can be tested at any moment, to ascertain whether it is in correct working order or not; and, furthermore, the actual pressure indicated can be calculated with great ease, so as to prove the correctness in the construction, or to construct the gage without the necessity of a testing-pump, to aid in marking the scale.

In the drawing, Figure 1 is an elevation, and Fig. 2 is a vertical section, of my improved gage.

The pipe and cock $a$ connect with the boiler or other vessel, the pressure in which is to be denoted; and $b$ is a cylinder, in which is a small plunger-rod, $c$, that slides freely in the guides 2 and 3, and the upper one of these guides should be sufficiently tight to prevent much leakage—still it is better that globules of water should escape at this point, to prevent friction, and the leakage is caught in the cylinder $d$, and conveyed to a blow-off pipe, $e$, which pipe, also, is connected to the cylinder $b$ by the cock $f$, so as to allow for clearing the cylinder $b$ from pressure in testing the gage, by closing the cock $a$ and opening the cock $f$. The weight $g$ is suspended by the rods $h$ and cross-head $i$, and it would be sufficient to prevent the plunger-rod $c$ rising until after the maximum pressure had been arrived at in the cylinder $b$, were it not for the other parts of the gage; hence, in calculating the greatest pressure that the gage is adapted to stand, the sectional area of the rod $c$ must be ascertained, and the maximum pressure will bear the same relation to the of weight $g$ that the area of $c$ does to the square inch.

In order to make this weight available in denoting any pressure less than the maximum pressure, I insert the said weight in the tube $l$, there being, preferably, at least one-sixteenth of an inch space all around between the tube $l$ and weight $g$, and mercury is poured into this tube sufficient to float this weight $g$.

It will now be evident that, when the weight is floated, it will not exert any force in holding down the plunger-rod $c$, and that, as said plunger-rod $c$ rises, in consequence of the pressure acting against it, the weight is raised and becomes more and more effective as a resistance to the movement of the rod $c$, until it is finally lifted out of the mercury, and the maximum pressure is arrived at, and the entire resisting force of the weight acts against the plunger as a definite force or dead weight.

Of course the pressures will be from 0 to maximum, according to the position of the weight, and by marking 0 on the scale $w$, when the weight floats, and the maximum pressure at the level of the mercury when the weight is lifted out, the intermediate scale will be divided up proportionately, if the weight $g$ is parallel; but if irregular, the scale will have to be marked after each test by a pump and pressure-standard.

The tube $l$ may be of glass, partially inclosed in a metal case, so that the level of the mercury is visible at the scale $w$; or a separate tube, $s$, may be employed, as shown, the same opening at top and bottom into the tube $l$.

A screw or cap at $t$ allows for the insertion of a wire and material for wiping the inside of the glass gage-tube $s$.

The movement of the weight may be indicated on a dial by a hand, with a pinion that receives motion from a rack connected with the weight or cross-head.

The plunger may be below the weight, and connected therewith by slings that pass up at the sides of the tube containing such weight. The plunger $c$ is preferably suspended from the cross-head $i$, as represented in Fig. 3.

I claim as my invention—

1. The combination, in a pressure-gage, of a direct-acting weight and a column of mercury, that sustains the same at the zero or point of no pressure, with a sliding plunger, cross-head, and slings connected to such weight, and acting to lift the same out of the mercury as the pressure increases, substantially as set forth.

2. The plunger $c$, sliding in the guides 2 and 3 of the cylinder $b$, to which the pressure is admitted by the cock $a$, in combination with the cross-head $i$, sling-rods $h$, and weight $g$, which is progressively counterpoised by a hydrostatic column as it descends, substantially as set forth.

Signed by me this 18th day of March, A. D. 1875.

JOHN POWERS.

GEO. T. PINCKNEY,
CHAS. H. SMITH.